United States Patent [19]
Pivar

[11] 3,810,727
[45] May 14, 1974

[54] THERMALLY CONTROLLED APPARATUS FOR MOLDING HOLLOW PASTIC ARTICLES AND THE LIKE

[75] Inventor: Stewart Pivar, Muttontown, N.Y.
[73] Assignee: Rototron Corporation, Farmingdale, N.Y.
[22] Filed: Nov. 15, 1972
[21] Appl. No.: 306,608

Related U.S. Application Data
[63] Continuation-in-part of Ser. No. 256,695, May 25, 1972, and a continuation of Ser. No. 103,893, Jan. 4, 1971, Pat. No. 3,676,037, and a continuation of Ser. No. 724,803, April 29, 1968, abandoned.

[52] U.S. Cl.................. 425/144, 425/430, 425/435
[51] Int. Cl. ............................................. B29c 5/04
[58] Field of Search ........... 425/144, 429, 430, 435; 164/118; 264/311, 319

[56] References Cited
UNITED STATES PATENTS

| | | | |
|---|---|---|---|
| 3,676,037 | 7/1972 | Pivar | 425/435 |
| 2,967,329 | 1/1961 | Friedland et al. | 425/430 X |
| 3,663,682 | 5/1972 | Nitta et al. | 425/435 X |

FOREIGN PATENTS OR APPLICATIONS

| | | | |
|---|---|---|---|
| 842,347 | 7/1960 | Great Britain | 425/429 |

Primary Examiner—J. Spencer Overholser
Assistant Examiner—John E. Roethel
Attorney, Agent, or Firm—Roberts & Cohen

[57] ABSTRACT

Apparatus for molding hollow plastic articles in which a mold is simultaneously rotated about two mutually perpendicular axes, a source of heat being located at a position generally radially displaced relative to a circle described by the mold. The mold is supported in a frame which is of adjustable size, there being provided a telescopic drive for rotating the mold and which is extensible to accommodate adjustments in the frame. In the above-indicated apparatus as well as apparatus of the same type, the mold will generally have a profile such that the relative spacing beween the mold and source of heat will vary during relative movement therebetween. To provide thermal compensation for the tendency of the relative spacing to change, there is provided a cam rotatable with the mold and having a profile corresponding with the profile of the mold which controls either the flame of the burner constituting the source of heat or the physical location of the burner relative to the mold or both. The control is effected through a series of servo mechanisms controlled by a cam follower.

7 Claims, 3 Drawing Figures

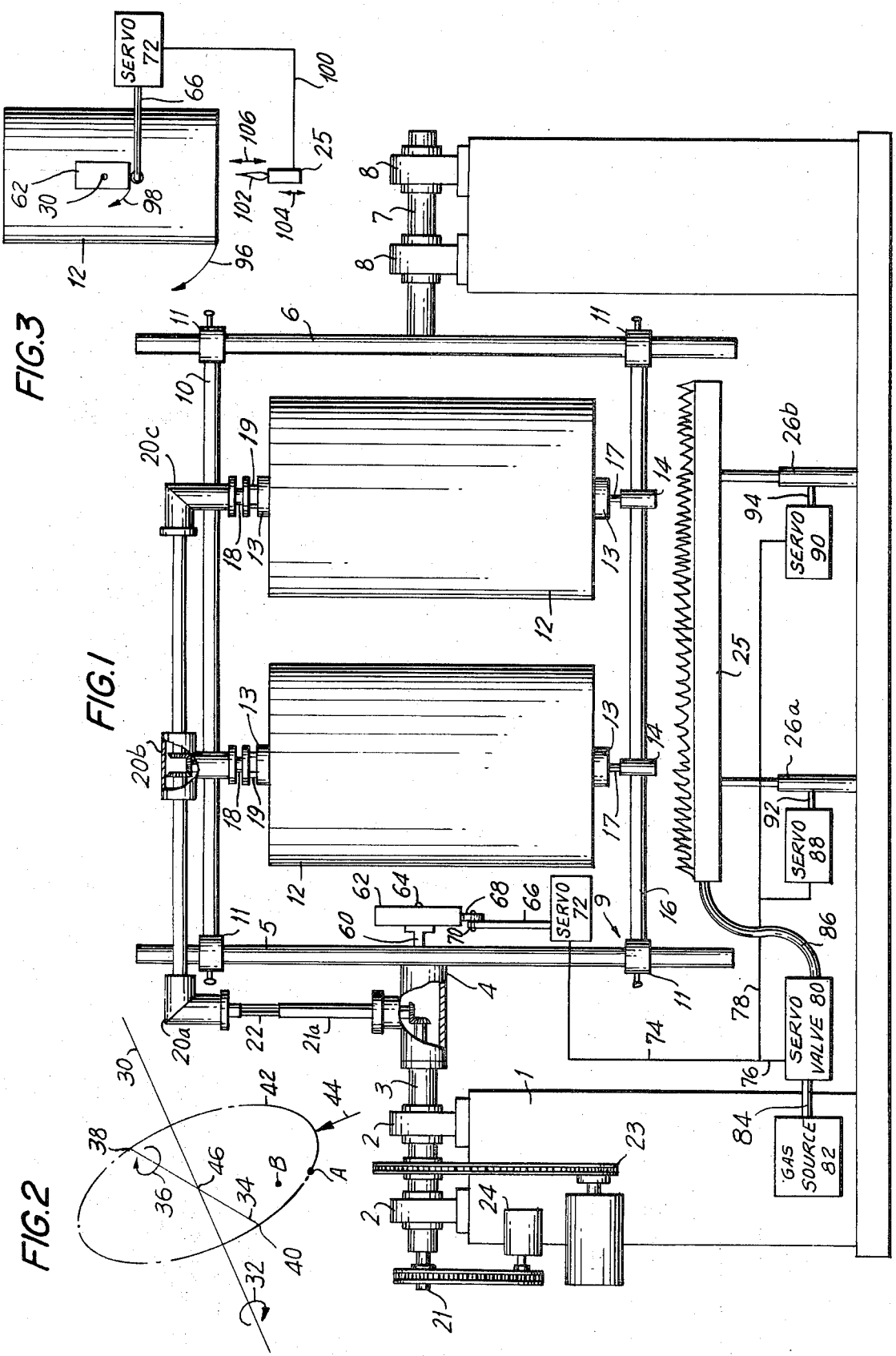

THERMALLY CONTROLLED APPARATUS FOR MOLDING HOLLOW PASTIC ARTICLES AND THE LIKE

RELATED APPLICATIONS

This application is a continuation-in-part of my copending continuation Ser. No. 256,695 filed May 25, 1972 of streamlined continuation Ser. No. 103,893, filed Jan. 4, 1971 and now U.S. Pat. No. 3,676,037 dated July 11, 1972 and of Ser. No. 724,803, filed Apr. 29, 1968, now abandoned.

FIELD OF THE INVENTION

This invention relates to apparatus for molding hollow objects of thermoplastic materials and particularly those in the form of fluids or finely divided powders such as vinyl plastisols and powdered polyolefins.

BACKGROUND

A method of molding called rotational molding has been known for many years and is widely used. This method involves the use of hollow molds rotatable simultaneously about two mutually perpendicular axes within a heating oven. Such machines generally embody three spindles each mounted with a plurality of molds. The spindles are arranged to enter consecutively three stations, these being the heating oven, a cooling chamber and an area whereat the molds are emptied and recharged. The oven usually includes a system to circulate the air for the purpose of evenly distributing the heat. Where a multiplicity of small molds is being used, the output of molded parts per unit time can be quite large. This is not the case, however, when large moldings are being made where limitations in the size of the heating oven preclude the use of more than one mold at a time.

In cases where the number of molded pieces required is small, it is not economically feasible to build a large number of molds. In such instances, oven-type rotational molding machines do not function efficiently and do not justify their high cost.

The apparatus which is the subject of my earlier filed applications as identified above provides simpler and less expensive means to manufacture hollow thermoplastic moldings. More particularly, it comprises means to rotate a mold simultaneously about two mutually perpendicular axes with gas burners located beneath the rotating mold to act as a source of heat. It also includes means for creating the necessary rotational movements of the mold which are uniquely adaptable to an apparatus which is not constrained to function in a confined environment inside of a heating oven.

SUMMARY OF THE INVENTION

It is an object of the invention to provide an improvement applicable to apparatus disclosed in my previously filed applications.

It is another object of the invention to provide an improved molding apparatus in which thermal compensation is provided as may be required due to the change in spacing between a mold and its associated source of heat due to relative movement between the same.

In achieving the above and other objects of the invention, there is provided an apparatus comprising a molding means and a heating means which are displaceable relative to each other. The molding means may have a profile such that the relative spacing between the molding and heating means tends to change during relative movement therebetween. A further means is provided in accordance with the invention which is responsive in accordance with said profile to provide thermal compensation for the tendency of the relative spacing to change.

In accordance with one aspect of the invention, the aforesaid further means may control the movement of the heating means towards and away from the molding means.

In accordance with another aspect of the invention, the heating means may include a source of gas, there being provided a servo controlled valve and a burner coupled to said source via said valve, said further means controlling said valve.

More particularly, in accordance with the invention, there will be provided an apparatus comprising a burner, means to rotate a mold adjacent this burner, a cam rotatable by the same said means, said cam and mold rotating about a common axis and having a corresponding profile with respect to the axis. In further accordance with the invention there will be provided means responsive to the cam to control the burner in correspondence with the aforesaid profile.

According to a particular aspect of the invention, the burner may be parallel to the axis and physically adjustable with respect thereto, said means controlling displacement of the burner towards and away from the axis.

As has been noted hereinabove, the apparatus may comprise a source of gas and a valve coupling said source to said burner, said means controlling said valve.

In accordance with still another aspect of the invention, both of the aforenoted types of controls may be employed so that, for example, the physical displacement of the burner towards and away from the aforesaid axis as well as the size of flames issuing from the burner may both be controlled.

Although not illustrated herein, it may be possible in accordance with the invention to control displacement of the mold towards the burner itself so that the burner may remain stationary.

As will be seen hereinafter, the specifically illustrated embodiment of the invention employs a cam follower active to control a servo mechanism which controls the burner as to either physical displacement or size of flame or both.

Other objects, features and advantages of the invention will be found in the description which follows hereinafter.

BRIEF DESCRIPTION OF THE DRAWING

The invention will be more clearly understood from the detail description which follows as illustrated in the accompanying drawing in which:

FIG. 1 is a generally diagrammatic front view of a molding apparatus provided in accordance with the invention;

FIG. 2 is a diagram illustrating in perspective the geometric relationships of the different elements of the apparatus of FIG. 1; and FIG. 3 diagrammatically illustrates the relationship between a mold and cam and cam follower as employed in accordance with the invention.

DETAILED DESCRIPTION

Referring to FIG. 1, on a supporting frame 1 are mounted drive shaft pillow blocks 2 which support a hollow drive shaft 3, an end of which is attached to a right angle drive or T-coupling 4 which in turn is attached to and supports a radial member 5 of the rotation frame 9. At the opposite end of the machine is another radial member 6 which is supported by a shaft 7 which is free to rotate in and is supported by pillow blocks 8. The rotation frame 9 comprises also two horizontal members 10 and 16 which are attached adjustably to the radial members by sliding clamps 11 by means of which the horizontal members may be set at any distance from each other permitted by the extent of the distance of travel along the radial members.

Molds are mounted removably on the rotation frame by means of mold brackets 13 attached to the molds which engage attaching clamps 14 which are attached to the horizontal member 16 and to which are attached pins 17 which engage a hole in the mold bracket 13 in which it is free to rotate. The opposite end of the mold is attached to drive brackets 18 to which are attached two pins 19 which withdrawably enter corresponding holes in the mold bracket 13.

Rotation is imparted to the molds through the drive brackets 18 by means of a secondary drive shaft system comprising right angle drives 20a–c which transmit the power from the secondary drive shaft 21 which passes through the hollow drive shaft 3. The telescoping shaft 21a is a keyed hollow telescoping shaft, the bore of which engages shaft 22 which is free to slide in and out when the horizontal member is adjusted to different positions along the radial members 5 and 6. Power is supplied to the drive shaft by a motor 23 and to the secondary shaft 21 by a motor 24.

A burner 25 is located beneath the molds and is supported adjustably by the burner supports 26a and b which permit a raising or lowering of the position at which the burner is set. This is employed as will hereinafter be shown. The length of the burner is less than the distance between the radial members 5 and 6.

The steps of producing a molded article by the apparatus described in the subject invention are as follows: a measured quantity of fluid or powdered thermoplastic molding material is placed into a mold which is mounted on the machine by engaging the associated mold brackets 13 with the attaching clamps 14 and the drive brackets 18. The burner is raised to a position as close as possible to the mold by adjusting the mold support brackets 26a and b.

The mold is caused by operation of motors 23 and 24 to rotate simultaneously about the two mutually perpendicular axes for a present interval of time which usually amounts to two to five minutes while being exposed to the heat of the gas burners. At the end of this interval, rotation is halted. The burner is then turned off and the mold is dismounted for cooling and is thereafter emptied of the finished molded article therein.

The mold chosen for illustration in the drawing is irregular in shape in the thermal sense in that some parts thereof are very much closer than others to the source of heat during rotation. It might be expected that these areas will receive more heat and consequently will produce a greater wall thickness in the corresponding areas of the molded article. However, thermal compensation can be provided in accordance with the invention in a manner which will be later described.

The apparatus as illustrated in FIG. 1 accommodates two molds. The rotation frame is shown supported at both ends. It can be supported by the drive shaft alone especially if only one mold is to be used. By building the rotation frame sufficiently long, four or five molds can, for example, be used simultaneously. Such a machine will nevertheless require about one-fifth the space required by an oven-type rotational molding machine.

Reference to FIG. 2 will provide a diagrammatic illustration of some of the principles involved in the operation of the apparatus. In FIG. 2, line 30 represents one of the two mutually perpendicular axes referred to above and in particular represents the axis about which the frame of the apparatus rotates such as, for example, in the direction indicated by arrow 32. Line 34 indicates the axis of the mold which second axis is perpendicular with the axis 30. The mold rotates in one direction or the other as indicated by way of example by arrow 36.

Generally speaking, the ends of the mold can be assumed to exist at the ends of axis 34 such as at 38 and 40. During the rotation contemplated in accordance with arrow 32, the ends 38 and 40 will describe a circle 42 concentric with axis 30 and lying in a plane which is perpendicular to the latter. The source of heat is indicated by arrow 44, this being directed radially inwards with respect to circle 42 towards the center 46 of the circle. The source 44 will preferably be located in a position at least substantially tangential to the circle.

In the above description was mentioned a radial or diametral member 5. On this member 5 is mounted at the axis 30 a mounting bracket 60. On the mounting bracket 60 is mounted a cam 62 which is detachably affixed to the mounting bracket by a bolt or nut 64.

A cam follower 66 is provided having a roller 68 pivotally mounted on the upper extremity thereof by means of a pin 70. The roller 68 trails around the periphery of the cam 62 and thus displaces the cam follower 66 in accordance with the profile of the cam 62.

The cam follower 62 controls a servo mechanism element 72 which is connected via an electrical connection 74 to electrical lines 76 and 78. Line 76 is connected to a servo valve 80 which is controlled by the movement of the cam follower 66 in correspondence with the profile of the cam 62. Valve 80 connects gas source 82 to the burner 25, the connections between source 82 and valve 80 and valve 80 and burner 25 being effected through hoses 84 and 86.

Electrical connection 78 is connected with servo control elements 88 and 90, these having mechanical links 92 and 94 with the adjustable burner supports 26a and 26b. The adjustable supports 26a and 26b are telescopically arranged supports which control the height of the burner 25 relative to the molds 12. The servo mechanisms 88 and 90 function through mechanical links 92 and 94 to control rack and pinion devices which in turn control the extension and retraction of supports 26a and 26b and therefore the physical displacement of burner 25 towards and away from the molds. Since servo mechanisms 88 and 90 function under the control of cam 62 operating through cam follower 64 and servo mechanism 72, it is seen that the position of the burner is controlled in accordance with the profile cam 62 and therefore the profile of molds 12. It is to be noted that two types of control are herein shown namely, the control of the position of the burner 25 relative to the molds 12 and the amount of gas fed through valve 80 to the burner 25 so that the height of the flames issuing from the burner can be controlled in accordance with the tendency of the spacing between the molds and the burner to change. It will, however, be appreciated that either of these two types of controls can be used to the exclusion of the other whereby only one type of specific control need be employed.

FIG. 3 illustrates the fact that the mold 12 may rotate in a direction indicated by arrow 96 around the axis 30 whereas cam 62 does likewise, as indicated by arrow 98. It will also be seen in this Figure that the cam 62 and mold 12 have corresponding profiles relative to the axis 30.

Also appearing in FIG. 3 is the action of the cam follower 66 which functions through servo mechanism 72 and the subsequent control system indicated generally by connecting line 100 to control burner 25 or the flames 102 issuing therefrom, in the manner indicated by arrows 104 and 106.

From what has been stated hereinabove, it will be seen that there is provided apparatus comprising a molding means and a heating means which are displaceable relative to each other and generally, which are provided in such a manner that the molding means tends to be displaced relative to the heating means as regards the profile of the same. In other words, the molding means has a profile such that the relative spacing between the molding and heating means tends to change during relative movement therebetween or in other words, during rotation of the mold while the burner is held stationary. Further shown in the above disclosure is a means responsive in accordance with the profile of the cam or of the molding means to provide thermal compensation for the tendency of the relative spacing between the molding and heating means to change.

It has been seen that the means provided in accordance with the invention may control the movement of the heating means towards and away from the molding means. It has, furthermore, been shown that the heating means may include a source of gas having a servo control valve with a burner coupled to the source by the valve, the valve being controlled to provide thermal compensation by varying the height of flames issuing from the burner in accordance with the tendency of the relative spacing between the molding and heating means to change.

More specifically, there has been shown a burner with means to rotate a mold adjacent the burner and a cam rotatable by the same said means, the cam and mold rotating about a common axis and having a corresponding profile with respect to this axis, there being furthermore provided means responsive to the cam to control the burner in correspondence with the profile.

Servo mechanisms useable in the above controls are well known and may be found, for example, in Basic Synchros and Servo Mechanisms by Van Valkenbrugh, Noogerand Neville, Inc. Vols. 1 and 2 (a Rider Publication).

What is claimed is:

1. Apparatus comprising molding means and heating means which are displaceable relative to each other, the molding means having a profile such that the relative spacing between said molding and heating means tends to change during relative movement therebetween, and further means responsive in accordance with said profile to provide thermal compensation for the tendency of said relative spacing to change, said further means controlling movement of the heating means towards and away from said molding means.

2. Apparatus comprising molding means and heating means which are displaceable relative to each other, the molding means having a profile such that the relative spacing between said molding and heating means tends to change during relative movement therebetween, and further means responsive in accordance with said profile to provide thermal compensation for the tendency of said relative spacing to change, said heating means including a source of gas, a servo controlled valve, and a burner coupled to said source via said valve, said further means controlling said valve.

3. Apparatus comprising a burner, means to rotate a mold adjacent said burner, a cam rotatable by said means, said cam and mold rotating about a common axis and having a corresponding profile with respect to said axis, and means responsive to said cam to control said burner in correspondence with said profile.

4. Apparatus as claimed in claim 3 wherein said burner is parallel to said axis and physically adjustable with respect thereto, the latter said means controlling displacement of said burner towards and away from said axis.

5. Apparatus as claimed in claim 3 comprising a source of gas and a valve coupling said source to said burner, the latter said means controlling said valve.

6. Apparatus as claimed in claim 5 wherein said burner is parallel to said axis and physically adjustable with respect thereto, the latter said means controlling displacement of said burner towards and away from said axis.

7. Apparatus as claimed in claim 3, wherein the latter said means comprising a cam follower, and servo means controlled by said cam follower to control said burner.

* * * * *